United States Patent

Petrov et al.

[15] 3,664,989

[45] May 23, 1972

[54] METHODS FOR THE PREPARATION OF SYNTHETIC POLYMERS

[72] Inventors: Gennady Nikolaevich Petrov, Lesnoi prospekt, 61, kv. 85; Grigory Fedorovich Lisochkin, ulitsa Reshetnikova, 13, kv. 107; Valentin Parmenovich Shmagin, Kaznacheiskaya ulitsa, 4, kv. 39; Olga Mikhailovna Shibanova, VO 15 Linia 8/40, kv. 21, all of Leningrad, U.S.S.R.

[22] Filed: Oct. 27, 1969

[21] Appl. No.: 869,935

Related U.S. Application Data

[63] Continuation-in-part of Ser. No. 575,552, Aug. 29, 1966, abandoned.

[52] U.S. Cl. ..........................260/82.1, 260/83.7, 260/94.2, 260/94.6, 260/879
[51] Int. Cl. ........................................C08d 3/04, C08d 3/08
[58] Field of Search ......................260/82.1, 83.7, 94.2, 879, 260/94.6

[56] References Cited

UNITED STATES PATENTS

| 3,278,508 | 10/1966 | Kahle et al. | 260/94.3 |
| 3,452,112 | 6/1969 | Kamienski et al. | 260/665 |
| 3,464,961 | 9/1969 | Foster | 260/83.7 |

*Primary Examiner*—Joseph L. Schofer
*Assistant Examiner*—Richard A. Gaither
*Attorney*—Waters, Roditi, Schwartz & Nissen

[57] ABSTRACT

A method for the homopolymerization of conjugated diene hydrocarbons or for the copolymerization of different dienes either with one another or with styrene-type monomers in order to prepare polymers or copolymers having a pre-set molecular weight, which comprises carrying out the homopolymerization or copolymerization of said hydrocarbons in the presence of an alkali metal catalyst, such as lithium, and a modifier obtained by reacting an alkali metal with a conjugated hydrocarbon and an organoaluminum compound, the alkali metal-to-aluminum molar ratio in said modifier being 1:1.

11 Claims, No Drawings

METHODS FOR THE PREPARATION OF SYNTHETIC POLYMERS

REFERENCES

The present Application is a Continuation-in-Part of Application Ser. No. 575,552 filed Aug. 29, 1966, now abandoned.

1. The present invention relates to catalytic homopolymerization of diene hydrocarbons with one another or with copolymerization of diene hydrocarbons and styrene-type monomers in the presence of organometallic compounds as modifiers.

The resultant polymers may find extensive application as ingredients of potting compounds, plasticizers, etc. (low molecular-weight polymers with or without terminal functional groups), in the tire industry and for the manufacture of mechanical rubber goods (high molecular-weight polymers of isoprene and butadiene, copolymers of isoprene or butadiene with other diene hydrocarbons, and butadiene-styrene copolymers).

2. It is known to produce the polymers of diene hydrocarbons or copolymers of diene hydrocarbons with one another or with styrene-type monomers by a process which comprises carrying out the homo-or copolymerization of said monomers in the presence of organolithium compounds as initiators and of organometallic compounds having the general formula $$Y_n MX_{v-n}$$

wherein:
Y denotes halogens, an alkoxy group, or a hydrocarbon radical;

initiators, even in the absence of modifiers, is not conducive to obtaining polymers having the desired molecular weight. Given hereinbelow is Table, in which are compiled relevant data derived from the examples recited in U.S. Pat. No. 3,278,508 (to Kahle et al.). The tabulated data illustrate said defect of organolithium initiators and relate to reference tests, in which the polymerization process was effected in the presence of organolithium compounds alone, no additives intended to diminish the intrinsic viscosity of target products being used (see Table 1). As can be seen from Table, the characteristic viscosity of the polymers obtained varies from 6.65 to 10.26 (cf. Examples II, VI, XI and XII) although the amount of the initiator, lithium methylnaphthalene, is constant, viz. 1.1.moles of the initiator per 100 g of monomer.

This irreproducibility of reference tests is due to the fact that the catalytic system is highly sensitive to impurities, which are capable of reacting with both the initiator and the propagating polymer chain. The latter property plays a significant role in the process of preparing polymers with functional groups, since it affects the degree of functional group incorporation into the polymer.

The method of polymerization involving the use of organolithium compounds as initiators and or organometallic modifiers makes it possible to diminish the intrinsic viscosity of polymers, i.e., to regulate the molecular weight of polymers, as compared with the intrinsic viscosity of polymers obtained in reference tests, in which the modifiers were dispensed with. However, in view of the fact that the organolithium initiator even alone is incapable of providing for the reproducibility of the results

TABLE 1

| Example number | Test No. | Monomer | Initiator [1] | Solvent, parts by weight | Temperature, °C. | Conversion, percent | η |
|---|---|---|---|---|---|---|---|
| I | 6 | Isoprene | 2.5 | Cyclohexane, 1,000 | 122 | 100 | 4.29 |
| VI | 10 | ___do___ | 2.5 | Pentane, 1,000 | 122 | 100 | 4.06 |
| II | 3 | ___do___ | 1.1 | ___do___ | 122 | 100 | 9.30 |
| VI | 3 | ___do___ | 1.1 | ___do___ | 122 | 100 | 7.1 |
| VI | 5 | ___do___ | 1.1 | ___do___ | 122 | 100 | 7.21 |
| VI | 8 | ___do___ | 1.1 | Pentane, 700 | 122 | 100 | 6.65 |
| XI | 4 | ___do___ | 1.1 | Pentane, 1,000 | 122 | 100 | 7.66 |
| XII | 4 | ___do___ | 1.1 | ___do___ | 122 | 100 | 10.26 |
| IX | 3 | Butadiene-1,3 | 1.2 | Cyclohexane, 780 | 122 | 100 | 4.89 |
| XIII | 2 | ___do___ | 1.2 | ___do___ | 122 | 100 | 2.98 |

[1] (Lithium methylnaphthalene), millimoles per 100 g. of monomer.

M is a metal of the groups IIB, IIIB and IVB of the periodic system;
X atoms of hydrogene or halogene
$n$ is an integer of 0 to 4, and
$v$ denotes the valence of the metal M.

The employment of said organometallic compounds in the process of diene hydrocarbon polymerization initiated by organolithium compounds makes it possible to reduce the intrinsic viscosity of the resultant polymers without affecting markedly the microstructure of the polymers in question.

However this prior art process suffers from a number of disadvantages.

Polymerizations, according to said process, call for the employment of organolithium compounds synthesized preliminarily by known procedures. Where use is made of an initiator consisting of a di- or polylithium-containing organometallic compound, the synthesis should be conducted in a polar solvent medium, insofar as said initiators are insoluble in a hydrocarbon medium. To obtain under these conditions linear polymers or polymers having a high percentage of cis-configurations, it is pertinent to substitute a hydrocarbon solvent for a polar one, which additional step makes the manufacturing process excessively complicated.

Moreover, organolithium compounds exhibit pronounced susceptibility towards various active admixtures and contaminants, so that the employment of organolithium compounds as of reference tests, the aforesaid combination of organolithium initiators and organometallic modifiers is hardly suitable for the preparation of polymers having prescribed molecular weights.

It is an object of the present invention to provide a method of preparing linear polymers of diene hydrocarbons or copolymers of different diene hydrocarbons with one another or with styrene-type monomers which will make it possible to obtain polymers or copolymers of any desired molecular weight.

It is another object of the present invention to provide linear polymers of diene hydrocarbons or copolymers of different diene hydrocarbons with one another or with styrene-type monomers having a prescribed molecular weight and containing terminal functional groups.

It is a further object of the present invention to provide hydrocarbon polymers noted for their high degree of bifunctionality and suitable for preparing therefrom urethane resins, thermoelastoplastics and other elastomers exhibiting a combination of useful properties associated with the hydrocarbon nature of the principal polymeric chain.

These and other objects are accomplished by carrying out the homopolymerization of conjugated diene hydrocarbons or the copolymerization of diene hydrocarbons with one another or with styrene-type monomers in the presence of an alkali metal as catalyst, the product of reacting an alkali metal with a diene hydrocarbon and with an organoaluminum compound being used as modifier.

The present method consists essentially in homopolymerizing said diene hydrocarbons or copolymerizing said diene hydrocarbons with one another or styrene-type monomers in the presence of an alkali metal as catalyst and also in the presence of a modifier consisting of a product of reacting an alkali metal with a diene hydrocarbon and an organoaluminum compound, the process of polymerization being carried out in the temperature range of from −30° to +150° C and the alkali metal-to-aluminum molar ratio in said modifier being 1:1.

Where it is desired to obtain a polymer containing functional groups, the polymerization product should be treated with an appropriate reagent in order to incorporate the requisite functional groups.

The process of polymerization or copolymerization may be conducted either continuously or batch-wise.

Diene monomers may consist of conjugated diene hydrocarbons, such as butadiene-1,3, isoprene, pentadiene-1,3 (piperylene), 2,3-dimethylbutadiene-1,3, styrene, α- methylstyrene, p-methylstyrene (p-vinyltoluene), etc.

Alkali metals, viz., lithium and sodium, are used as polymerization catalysts, the amount of the alkali metal catalyst taken exerting no effect on the molecular weight of the polymer obtained, but affecting the duration of the induction period. An excess of the alkali metal catalyst makes it possible to reduce substantially the induction period. When the present method is carried out batch-wise, excess alkali metal may be used again for subsequent polymerizations, while in the continuous embodiment of the present method the process is carried out until the catalyst is consumed completely.

The modifier used in the polymerization process for obtaining polymers having a pre-determined molecular weight consists of a product prepared by reacting a conjugated diene hydrocarbon with an alkali metal and an organoaluminum compound, the reaction being carried out in a hydrocarbon medium.

Use is made of organoaluminum compounds represented by the general formulas $AlR_3$, $AlR_2OR$, $AlR_2H$, $AlR_2Hal$ and $AlR_2NR_2$, wherein R designates an alkyl or aryl radical.

The conjugated diene hydrocarbons used comprise such dienes as butadiene-1,3, isoprene, 2,3-dimethylbutadiene-1,3, etc. The reaction of diene hydrocarbons with an alkali metal and an organoaluminum compound is conducted at a temperature of 20°–100° C in a saturated or aromatic hydrocarbon solvent medium or without solvents. To synthesize the modifier, the alkali metal-to-aluminum molar ratio should be at least 1:1 when the organoaluminum compound used is $AlR_3$, $AlR_2OR$ or $AlR_2NR_2$. In case the organoaluminum compound is of the formula $AlR_2H$ or $AlR_2Hal$, the alkali metal-to-aluminum molar ratio should be not less than 2:1.

The product obtained by reacting a diene hydrocarbon with an alkali metal and an organoaluminum compound is an organometallic compound in the form of a white, crystalline powder which is scarcely soluble in hydrocarbons, so that the reaction product can be readily separated and washed to remove the excess of reactants and thereafter analyzed to determine the content of the alkali metal, aluminum and also the composition of hydrocarbon radicals.

In the modifier used for carrying out the present method, the alkali metal-to-aluminum molar ratio equals 1:1, and the modifier serves for controlling the molecular weight in the course of the process of polymerizing diene hydrocarbons or of copolymerizing different diene hydrocarbons with one another or with styrene-type monomers in the presence of an alkali metal catalyst. The requisite amount of the modifier is calculated on the basis of the pre-set molecular weight of the target polymer and also from the modifier analysis by using the following equation:

$$M = (a \cdot m_o)/(r_o) \cdot M_o$$

wherein:

$M$ denotes the pre-set molecular weight of the target polymer;

$m_o$ is the number of moles of the monomer;

$r_o$ is the number of Al moles in the modifier;

$M_o$ is the monomer molecular weight, and $a=2$, if the organoaluminum compound used for modifier preparation is represented by the formula $AlR_3$, or when the polymers or copolymers to be synthesized have a molecular weight of not greater than 10,000. The modifier may be prepared and isolated in advance and introduced into the polymerization process as a finished product, or else it may be formed in situ, i.e., in the reaction medium prior to polymerization commencement.

In the latter instance, the amount of the alkali metal to be used in the polymerization process is determined by the amount of the organoaluminum compound used for modifier preparation. The alkali metal-to-aluminum molar ratio should be $> 1$ when use is made of an organoaluminum compound of the $AlR_3$, $AlR_2OR$, or $AlR_2NR_2$ type, while for organoaluminum compounds of the $AlR_2Hal$ or $AlR_2H$ type this molar ratio should be $> 2$.

The process of polymerization may be carried out in the presence of any amount of an alkali metal, provided the overall amount of the alkali metal contained in the modifier and used as the catalyst exceeds 1 mole per mole of the organoaluminum compound if use is made of $AlR_3$, $AlR_2OR$ or $AlR_2NR_2$ for the synthesis of the modifier, or is more than 2 moles per mole of the organoaluminum compounds of the $AlR_2Hal$ or $AlR_2H$ type.

Appropriate reference tests have shown the modifiers to be incapable of causing the polymerization of diene hydrocarbons and styrene-type monomers in the absence of an alkali metal catalyst.

The process of polymerization is carried out in or without a hydrocarbon solvent medium. Use can be made of the following solvents: saturated aliphatic hydrocarbons, both straight- and branched-chain (n-pentane, isopentane, hexane, heptane, octane, etc.), aromatic hydrocarbons (benzene, toluene, xylene), and also purified gasoline, the preferred solvents being aliphatic and aromatic hydrocarbons having from five to eight carbon atoms.

The process of polymerization is conducted at a temperature of from −30° to +150° C, preferably in the 0° to +80° C range.

In order to prepare polymers that contain α,ω-functional groups, the polymeryzate should be separated from excess catalyst and treated with appropriate reagents, such as olefin oxides, carbon dioxide, oxygen, sulfur, and epichlorohydrin. The employment of olefin oxides or oxygen results in the formation of polymers containing α,ω-hydroxyl groups, while terminal carboxylic groups are introduced when use is made of carbon dioxide. The reaction with sulfur leads to terminal SH-groups, whereas epichlorohydrin makes it possible to obtain polymers having α,ω-epoxy groups. The polymerization product should be treated with said reagents at a temperature of from −70° to +100° C in or without an inert hydrocarbon solvent. It is preferable to treat a 30–50 percent solution of the polymerization product with said reagents.

To attain the exhaustive introduction of functional groups, it is expedient to treat polymerization products at a reagent-to-aluminum molar ratio of at least 1:1.

After completing the polymerization process or upon treating the polymerizate with the reagents in order to incorporate thereinto functional groups, the reaction mass that contains catalyst and modifier residues should be decomposed with water or alcohol, washed with aqueous acid or alkali and then with water, and thereafter dried.

The molecular weight of polymers prepared by the method of the invention corresponds to that calculated by means of the formula given on page 8.

For a better understanding of the present invention, the following examples are given by way of illustration.

EXAMPLE 1

In a flask fitted with a reflux condenser are placed 200 ml of isoprene, 12.8 ml (0.05 mole) of Al $(iC_4H_9)_3$ and 0.35 g (0.05 gram-atom) of lithium metal wire. The reaction mixture is refluxed for 8 hours. Towards the end of the reaction, the lithium dissolves completely, and after the removal of excess isoprene by distillation there is obtained a white, crystalline material which is sparingly soluble in isoprene and saturated hydrocarbons, more soluble in aromatic hydrocarbons, and readily soluble in ether.

The reaction product contains, as determined by the analysis, 2.82 weight percent Li and 11.20 weight percent Al.

In a laboratory-type steel autoclave fitted with a stirrer are charged 0.48 g of the compound prepared as disclosed hereinabove, 500 ml of isoprene, 500 ml of isopentane, and 0.5 g of lithium metal.

The polymerization process is completed after 4 hours at a temperature of 60° C. The polymer is treated with ethyl alcohol and washed with dilute sulphuric acid and then with water. The solvent and water are distilled out under reduced pressure. The target product is dried at a temperature of 100° C and a residual pressure of 5–10 mm Hg.

The polymer thus obtained has the following characteristics:

| | |
|---|---|
| molecular weight | 340,000 |
| content of 1,4-units, % | 95 |

EXAMPLE 2

In a laboratory-type steel autoclave fitted with a stirrer are placed 1,000 ml of isoprene, 0.5 g of lithium metal, and 37.5 g of the modifier prepared in accordance with the procedure of Example 1.

The polymerization process is completed after 1 hour at a temperature of 60°, and the resultant polymer is treated as disclosed in Example 1.

The target polymer has the following characteristics:

| | |
|---|---|
| molecular weight | 8,800 |
| content of 1,4-units, % | 90 |

EXAMPLE 3

In a laboratory-type steel autoclave fitted with a stirrer are placed 550 g of butadiene-1,3, 0.5 g of lithium metal, and 615 g of the modifier prepared in accordance with the procedure of Example 1. The polymerization process is completed after 3 hours at a temperature of 60° C. The product is treated as disclosed in Example 1.

The target polymer has the following characteristics:

| | |
|---|---|
| molecular weight | 4,300 |
| content of 1,4-units, % | 80 |

EXAMPLE 4

In a laboratory-type steel autoclave fitted with a stirrer are placed 250 ml of isoprene, 500 ml of isopentane, 0.5 g of lithium metal, and 17.4 g of the modifier prepared in accordance with the procedure of Example 1.

The process of isoprene polymerization is carried out at a temperature of 60° C and, upon its end, to the autoclave there is added 135 g (2.5 moles) of butadiene-1,3, followed by heating the reaction mixture at 60° C. The polymerization process terminates within 2 hours, and the resultant copolymer is treated as disclosed in Example 1.

The copolymer thus prepared exhibits the following characteristics:

| | |
|---|---|
| content of 1,4-units, % | 90 |
| intrinsic viscosity | 0.25 |

EXAMPLE 5

In a laboratory-type steel autoclave fitted with a stirrer are placed 5.4 g of lithium metal, 89.2 g (0.45 mole) of triisobutylaluminum, 800 ml of isoprene, and 200 ml of isopentane. The reaction mixture is stirred, while maintaining the temperature at 60° C. After an induction period of 1 hour there commences polymerization, which terminates within 2 hours.

The resultant polymer is treated as disclosed in Example 1.

The polymer thus prepared has the following characteristics:

| | |
|---|---|
| molecular weight | 2,380 |
| content of 1,4-units, % | 85 |

EXAMPLE 6

In an autoclave fitted with a stirrer are placed 12.35 g of sodium metal, 102 ml (0.4 mole) of triisobutylaluminum, and 436 ml (5.22 moles) of butadiene-1,3. The stirred reaction mixture is maintained at a temperature of 60° C, and the process of polymerization terminates within 1.5 hours. The resultant polymer is treated as disclosed in Example 1.

The polymer thus prepared has the following characteristics:

| | |
|---|---|
| molecular weight | 1,450 |
| content of 1,2-units, % | 74 |
| content of 1,4-units, % | 26 |

EXAMPLE 7

In a flask fitted with a reflux condenser are placed 100 ml of isoprene, 21.4 g (0.1 mole) of $Al(iC_4H_9)_2(OiC_4H_9)$, and 0.7 g of lithium metal. The reaction mixture is refluxed for a period of 6 hours, and towards the end of the reaction the lithium metal undergoes complete dissolution. After the removal of excess isoprene by distillation, there is obtained a white, crystalline compound containing 2.61 weight percent Li and 10.48 weight percent Al.

In a laboratory-type steel autoclave fitted with a stirrer are placed 290 ml of isoprene, 0.5 g of lithium metal, and 20 g of the compound (modifier) prepared as disclosed hereinabove. The polymerization process is carried out at a temperature of 60° C and terminates within 1 hour. The resultant polymer is treated by following the procedure of Example 1.

The target polymer exhibits the following characteristics:

| | |
|---|---|
| viscosity at 25° C., poise | 290 |
| content of 1,4-units, % | 83 |

EXAMPLE 8

In a flask fitted with a reflux condenser and a stirrer is placed 400 ml of a solution containing 0.4 mole of $Al(iC_4H_9)_3$ in n-hexane, and to the vigorously stirred and cooled solution is added 100 ml of a solution of 0.4 mole diethylamine in n-hexane. On reaction completion, to the contents of the flask there are added 3 g of lithium metal and 100 ml of isoprene, and the reaction mixture is maintained at a temperature of 60° C for 10 hours until the lithium metal undergoes complete dissolution.

The product isolated from the reaction mixture contains 2.7 weight percent Li and 10.58 weight percent Al.

In a steel autoclave fitted with a stirrer are placed 250 ml of isoprene, 0.5 g of lithium metal and 17.3 g of the modifier prepared as disclosed hereinabove. The polymerization process is carried out at a temperature of 60° C and terminates within 30 min.

The resultant polymer is treated as disclosed in Example 1.

The polymer thus prepared has the following characteristics:

| | |
|---|---|
| viscosity at 25° C., poise | 595 |
| content of 1,4-units, % | 87 |

EXAMPLE 9

In an autoclave fitted with a stirrer are placed 0.5 g of lithium metal, 0.1 g of the modifier synthesized by following the procedure of Example 1, 220 ml (2.62 moles) of butadiene-1,3, 40 ml (0.35 mole) of styrene, and 500 ml of toluene. The stirred reaction mixture is maintained at 40° C for a period of 5 hours, and the reaction product is treated as disclosed in Example 1.

The polymer thus prepared has the following characteristics:

| | |
|---|---|
| content of styrene units, % of butadiene, | 18.7 |
| content of 1,4-addition units, % | 85 |
| intrinsic viscosity at 25° C. | 5.6 |
| glass-transition temperature, ° C. | −90 |

EXAMPLE 10

In an autoclave fitted with a stirrer are placed 0.5 g of metallic lithium, 0.14 g of the modifier prepared by following the procedure of Example 1, 220 ml (2.62 moles) of butadiene-1,3, 40 ml (0.35 mole) of styrene, and 500 ml of toluene. The stirred mixture is maintained at a temperature of 40° C for a period of 5 hours, followed by treating the reaction product as disclosed in Example 1.

The polymer thus prepared has the following characteristics:

| | |
|---|---|
| content of styrene units, % of butadience | 22 |
| content of 1,4-addition units, % | 82 |
| intrinsic viscosity | 1.8 |
| glass-transition temperature, ° C. −88 | |

EXAMPLE 11

Isoprene polymerization is carried out in accordance with the procedure and under the conditions disclosed in Example 1, except for the fact that hexane is used as the solvent in place of isopentane. The polymer thus prepared exhibits characteristics identical to those recited for the polymer of Example 1.

EXAMPLE 12

In a laboratory-type autoclave fitted with a stirrer are placed 200 g of metallic lithium, 300 ml of isoprene, 1,000 ml of isopentane, and 0.4 mole of triisobutylaluminum. The stirred reaction mixture is maintained at a temperature of 60° C, and after 0.5 hour there commences the process of polymerization, which terminates within 1 hour. The solution containing the polymerization product is freed of excess lithium metal and thereafter treated as disclosed in Example 1.

The polymer thus prepared has the following characteristics:

| | |
|---|---|
| molecular weight | 1,000 |
| content of 1,4-addition units, % | 80 |
| viscosity at 25° C., poise | 3.0 |
| glass-transition temperature, ° C. | −65 |

EXAMPLE 13

300 ml of isoprene, 1,000 ml of isopentane, and 0.1 mole of triisobutylaluminum are placed in a stirred laboratory-type autoclave containing the metallic lithium unconsumed after the polymerization described in Example 12 and washed with isopentane. The process is carried out by following the procedure of Example 12.

The polymer thus prepared has the following characteristics:

| | |
|---|---|
| molecular weight | 3,920 |
| content of 1,4-addition units, % | 85 |
| viscosity at 25° C., poise | 31 |
| glass-transition temperature, ° C. | −67 |

EXAMPLE 14

300 ml of isoprene, 1,000 ml of isopentane and 0.4 mole of triisobutylaluminum are placed in a laboratory-type autoclave fitted with a stirrer and containing the metallic lithium unconsumed after the polymerization disclosed in Example 13 and washed with isopentane. The polymerization is carried out as disclosed in Example 12, and on polymerization termination into the autoclave is introduced 1,240 ml of butadiene-1,3. The polymerization of butadiene-1,3 at 60° C proceeds for a period of 1 hour. The polymerization product-containing solution is treated in accordance with the procedure of Example 12.

The copolymer thus prepared has the following characteristics:

| | |
|---|---|
| molecular weight | 4,800 |
| content of 1,4-addition units, % | 85 |
| viscosity at 25° C., poise | 22 |
| glass-transition temperature, ° C. | −92 |

EXAMPLE 15

In a laboratory-type steel autoclave fitted with a stirrer are placed 10 g of metallic lithium, 90 g of diisobutylaluminum chloride, 500 ml of isopentane, and 740 ml of isoprene. The reaction mixture is stirred at 40° C, and after an induction period of 3 hours there commences the process of polymerization, which comes to completion within 3 hours. The resultant polymer is treated as disclosed in Example 1.

The polymer thus prepared has the following characteristics:

| | |
|---|---|
| molecular weight | 1,930 |
| viscosity at 25° C., poise | 15 |
| content of 1,4-addition units, % | 84 |
| glass-transition temperature, ° C. −67 | |

EXAMPLE 16

In a cascade polymerization system which consists of four 16-l. stainless steel reactors fitted with stirrers (100 r.p.m.) having a circumferential velocity of 1 m/sec at the blade edge and also with filtering arrangements (screens in the reactor bottom), two reactors are charged with 500 g of metallic lithium each. Next, through the system of stirred reactors there is passed 175 l. of the reaction mixture consisting of 83.1 l. of gasoline, 8.8 l. of a solution of $Al(iC_4H_9)_3$, and 83.1 l. of butadiene-1,3, the feed rate being 7 l/hr and the reaction temperature 60° C. Samples are taken at the exit side of the last reactor in order to determine monomer conversions. In the course of 20 hours the conversion remains practically constant and equals 90–85 percent. Then, the conversion drops sharply and equals 66 percent after 22 hours and 30 percent after 23 hours, so that the polymerization process is discontinued due to complete consumption of the metallic lithium charge.

The resultant polymer is washed with an aqueous solution of sulfuric acid in order to remove catalyst residues, followed by washing with water and drying at a temperature of 80°–100° C.

The polymer thus prepared has the following characteristics:

| | |
|---|---|
| molecular weight | 5,100 |
| viscosity at 25° C., poise | 32 |
| glass-transition temperature, ° C., | −88 |

EXAMPLE 17

The polymerization product obtained in accordance with the procedure of Example 2 is diluted with 1,000 ml of toluene and 15 ml of ethylene oxide is introduced into the autoclave while vigorously stirring and cooling the reaction mixture. Then reaction product is treated, washed and dried as disclosed in Example 1.

The polymer thus prepared has the following characteristics:

| | |
|---|---|
| molecular weight | 8,650 |
| content of OH-groups, % | 0.4 |
| content of 1,4-addition units, % | 88 |
| viscosity at 25° C., poise | 225 |

EXAMPLE 18

The polymerization product obtained in accordance with the procedure of Example 3 is diluted with 800 ml of toluene and treated with 33 ml of propylene oxide. The reaction product is treated, washed and dried as disclosed in Example 1.

The polymer thus prepared has the following characteristics:

| | |
|---|---|
| molecular weight | 4,100 |
| content of OH-groups, % | 0.81 |
| content of 1,4-addition units, % | 82 |
| viscosity at 25° C., poise | 35 |
| glass-transition temperature, ° C. | −89 |

EXAMPLE 19

The polymerization product obtained in accordance with the procedure of Example 3 is diluted with 1,000 ml toluene and poured onto crushed solid carbon dioxide, while stirring continuously the reaction mixture. The reaction product is treated with 5 percent hydrochloric acid and thereafter washed with water. After stripping off the solvent and water, the polymer is subjected to drying as disclosed in Example 1.

The polymer thus prepared has the following characteristics:

| | |
|---|---|
| molecular weight | 4,400 |
| content of COOH-groups, % | 2.01 |
| content of 1,4-addition units, % | 81 |
| viscosity, poise | 58 |
| glass-transition temperature, ° C. | −80 |

EXAMPLE 20

The copolymerization product obtained in accordance with the procedure of Example 14 is treated in an autoclave with 62 ml of epichlorohydrin, the reaction mixture being maintained at room temperature. Next, the reaction product is heated for a period of 1–1.5 hours with a 30 percent aqueous solution of NaOH followed by washing and drying the product as disclosed in Example 1.

The polymer thus prepared has the following characteristics:

| | |
|---|---|
| molecular weight | 4,920 |
| content of epoxy groups, % | 1.75 |
| content of 1,4-addition units, % | 84 |
| viscosity at 25° C., poise | 32 |
| glass-transition temperature, ° C. | −84.5 |

EXAMPLE 21

In a laboratory-type steel autoclave fitted with a stirrer are placed 7.0 g of metallic lithium, 33 g of diisobutylaluminum hydride, 500 ml of isopentane, 100 g of p-vinyltoluene, and 670 ml of butadiene-1,3. The stirred reaction mixture is maintained at a temperature of 80° C, and after an induction period of 30 min. there commences the process of polymerization, which terminates within 1.5 hours. The autoclave is allowed to cool and thereafter the polymerization product is treated with 25 ml of propylene oxide.

The reaction product is next treated, washed and dried as disclosed in Example 1.

The polymer thus prepared has the following characteristics:

| | |
|---|---|
| molecular weight | 4,900 |
| content of OH-groups, % | 0.67 |
| content of styrene units, % of butadiene, | 20 |
| content of 1,4-addition units, % | 83 |
| viscosity at 25° C., poise | 218 |
| glass-transition temperature, ° C. | −84 |

The present method makes it possible to synthesize polymers containing various terminal functional groups which may be used for the production of linear, branched or cross-linked high-molecular compounds noted for their outstanding physical and mechanical properties, e.g. high freeze resistance. For example, from polydienediols, prepared according to the present method and containing 0.6–1.2 percent of terminal OH-groups, it is possible to synthesize different urethane polymers to be used as components of various formulations. The properties of cured urethane compositions are listed in Table 2.

TABLE 2

| Property | Thermoplastic polydiene urethanes | Polymers [1] | Cured polydiene-urethane epoxides [2] | Cured polydiene-urethane diacrylates [3] |
|---|---|---|---|---|
| Tensile strength, kg./cm.$^2$ | 80–300 | 20–130 | 30–200 | 60–220 |
| Ultimate elongation, percent. | 400–100 | 400–70 | 100–30 | 200–30 |
| Glass MMM-transition temperature, ° C. | −75 | From −75 to −65 | From −75 to −65 | From −60 to −40 |
| Moisture absorption after 24 hours at 20° C., percent by weight. | 0.5 | 0.3 | 0.4 | 0.2 |
| Dielectric power factor | 0.012 | 0.005–0.02 | 0.01–0.03 | 0.007–0.01 |
| Dielectric permeability. | 2.7 | 2.8–3.5 | 2.5–4.5 | 2.7–3.1 |
| Volume resistivity, ohm-cm. | $1 \times 10^{14}$ | $1 \times 10^{14}$ | $1 \times 10^{13}$–$1 \times 10^{14}$ | $1 \times 10^{14}$ |

[1] Containing trisocyanurate rings in the chain (elastic plastics).
[2] Containing 1–4% of epoxy groups.
[3] Containing 2.5–3% of acrylate groups.

Although the present invention has been described with reference to the preferred embodiment thereof, many modifications and changes will occur to those skilled in the art. It is, therefore, to be understood that the appended claims are intended to cover all such modifications and changes as fall within the true spirit and scope of the invention.

We claim:

1. A method for homopolymerizing conjugated diene hydrocarbons or copolymerizing different conjugated diene hydrocarbons with one another or with styrene-type monomers to obtain polymers or copolymers having a predetermined molecular weight, said method comprising carrying out the process of homopolymerization or copolymerization at a temperature in the range of from −30° to +150° C in the presence of an alkali metal catalyst and a modifier prepared by reacting an alkali metal with a conjugated diene hydrocarbon and an organoaluminum compound, the alkali metal-to-aluminum molar ratio in said modifier equal to 1:1.

2. A method according to claim 1, wherein lithium is the catalyst.

3. A method according to claim 1, wherein sodium is the catalyst.

4. A method according to claim 1, wherein the organoaluminum compound is selected from the group consisting of compounds of the formulas $AlR_3$, $AlR_2OR$, $AlR_2H$, $AlR_2Hal$ and $AlR_2NR_2$, wherein R is an alkyl or aryl having from one to 10 carbon atoms and Hal is a halogen atom.

5. A method according to claim 1, wherein polymerization is carried out in the presence of any amount of alkali metal catalyst, with the proviso that the total amount of alkali metal contained in the modifier and used as the polymerization catalyst exceeds one mole per mole of the organoaluminum compound, and wherein the organoaluminum compound has the formulas $AlR_3$, $AlR_2OR$ or $AlR_2NR_2$ wherein R is an alkyl or aryl group of 1 to 10 carbon atoms.

6. A method according to claim 1, wherein polymerization is carried out in the presence of any amount of alkali metal catalyst, with the proviso that the total amount of alkali metal contained in the modifier and used as the polymerization catalyst exceeds two moles per mole of the organoaluminum compound, and wherein the organoaluminum compound has the formulas $AlR_2Hal$ or $AlR_2H$ wherein R is an alkyl or aryl group of one to 10 carbon atoms.

7. A method according to claim 1, wherein the modifier is obtained in situ from a diene hydrocarbon, an alkali metal and an organoaluminum compound in the reaction medium which contains said components in amounts which are adequate for the preparation of a polymer.

8. A method according to claim 1, wherein in order to prepare a polymer having $\alpha, \omega$-functional groups, the reaction mixture is treated, after completion of the polymerization with reagents which provide the desired functional groups into the thus obtained polymer.

9. A method according to claim 8, wherein the reagents which provide functional groups are selected from the group consisting of olefin oxides, carbon dioxide, and epichlorohydrin.

10. A method according to claim 1, wherein polymerization is carried out at a temperature in the range of from 0° to 80° C.

11. A method according to claim 1, wherein the molecular weight of the polymers to be synthesized is calculated from the equation $$M = (a \cdot m_o)/(r_o) \cdot M_o$$

wherein:

M denotes the predetermined molecular weight of the target polymer;

$m_o$ is the number of moles of monomer;

$r_o$ is the number of Al moles in the modifier;

$M_o$ designates the molecular weight of the monomer, and $a=2$, provided the organoaluminum compound used for preparation of the modifier is represented by the formula $AlR_3$, or when the polymers or copolymers to be synthesized have a molecular weight of not greater than 10,000.

* * * * *